United States Patent [19]

Tanaka

[11] Patent Number: 5,620,122
[45] Date of Patent: Apr. 15, 1997

[54] DEVICE FOR OPENABLY SUPPORTING A LID AND A CUP HOLDER UTILIZING THE DEVICE

[75] Inventor: Tsutomu Tanaka, Tochigi-ken, Japan

[73] Assignee: Nifco Inc., Yokohama, Japan

[21] Appl. No.: 563,668

[22] Filed: Nov. 28, 1995

[30] Foreign Application Priority Data

Dec. 2, 1994 [JP] Japan .................................. 6-323981

[51] Int. Cl.$^6$ ........................................................ B60R 9/00
[52] U.S. Cl. ...................... 224/275; 224/926; 220/264; 220/332; 296/37.15
[58] Field of Search ............................. 296/37.15, 37.13, 296/37.5; 220/264, 331, 332; 224/275, 926, 539, 241

[56] References Cited

U.S. PATENT DOCUMENTS 5,280,848 1/1994 Moore .................. 224/275 X
5,520,313 5/1996 Toshihide .................. 224/539

*Primary Examiner*—Renee S. Luebke
*Attorney, Agent, or Firm*—Oblon, Spivak, McClelland, Maier & Neustadt, P.C.

[57] ABSTRACT

A device for openably supporting a lid includes two axes of lid rotation for reducing the radius of lid rotation during opening and closing and a cup holder includes a cup holder body having a top opening communicating with at least one internal compartment for holding a cup and a bottom surface configured to conform to an intended mounting surface for enabling the top opening to lie horizontally after mounting, a lid for opening and closing the top opening of the cup holder body, and the aforesaid device for openably supporting the lid.

2 Claims, 8 Drawing Sheets

DEVICE FOR OPENABLY SUPPORTING A LID AND A CUP HOLDER UTILIZING THE DEVICE

BACKGROUND OF THE INVENTION

1. Field of the Invention

This invention relates to a device for openably supporting the lid of a cup holder installed in the center console of an automobile and to a cup holder utilizing the device.

2. Description of the Prior Art

It is a common practice to provide a cup holder in the center console of an automobile. While some of the prior art cup holders of this type are merely depressions formed in the upper surface of the center console, others are provided with lids for keeping out dust and the like. The cup holders with lids use different methods of lid attachment. In some, the lid is attached so as to open and close by rotating about a single pin (single-pin type). In others, the lid is attached to be opened from its lowered, latched position by being once slid downward and then released (sliding type).

Since the single-pin type lid rotates about a single rotation axis, the outer edge of the lid moves along a large arc during opening and closing and considerable space therefore has to be secured for opening and closing of the lid. A cup holder with this type of lid is therefore not well suited for installation in the center console where space is at a premium.

While the cup holder with the sliding type lid enables smooth opening of the lid without interference with surrounding components even when the lid is provided flush with its surroundings, the fact that the lid has to be once slid downward means that the amount of space required above the lid is even greater than in the case of the cup holder with the single-pin lid. The locations at which it can be installed are therefore limited.

One object of the invention is to overcome the aforesaid problems of the prior art by providing a device for openably supporting a lid and a cup holder which reduce the amount of space required for lid opening and closing.

SUMMARY OF THE INVENTION

For achieving this object, the invention provides a device for openably supporting a lid comprising a first rotation axis provided on an end surface of a case (lidded object) closed by the lid, an arm member rotatable about the first rotation axis and having a notch and a shaft insertion hole at its distal end portion, an arcuate guide slot formed in the end surface of the case along a path described by the distal end portion of the arm member when the arm member rotates about the first rotation axis, an auxiliary guide slot formed as a depression in an upper edge of the guide slot, a first support member having a shaft-like portion which projects from the lid, through the guide slot and into the notch of the arm member, moves along the guide slot with opening/closing of the lid and makes contact with a first end of the guide slot when the lid is completely open, a second support member having a shaft-like portion which projects from the lid, through the guide slot and into the shaft insertion hole of the arm member, moves along the guide slot with opening/ closing of the lid and makes contact with a second end of the guide slot when the lid is almost completely closed, and an energizing member for pressing the first support member in the direction of the upper edge of the guide slot, the energizing member applying a force to the first support member when the lid is at greater than a prescribed opening angle for moving the first support member into contact with the first end of the guide slot while rotating the arm member about the first rotation shaft and completely opening the lid, and the energizing member applying a force to the first support member when the lid is at less than the prescribed opening angle for moving the first support member toward the auxiliary guide slot till the second support member makes contact with a the second end the guide slot and then rotating the first support member about the second support member as a second rotation axis thereby causing the first support member to move along a side surface of the notch till the first support member enters the auxiliary guide slot and the lid is completely closed.

The invention further provides a cup holder comprising a cup holder body having a top opening communicating with at least one internal compartment for holding a cup and a bottom surface configured to conform to an intended mounting surface for enabling the top opening to lie horizontally after mounting, a lid for opening and closing the top opening of the cup holder body, and at least one device for openably supporting the lid on the cup holder body.

As is clear from the foregoing, the device for openably supporting a lid according to this invention completely opens the lid when it is at greater than a prescribed opening angle by rotating the first support member about the first rotation axis and completely closes the lid when it is at less than the prescribed opening angle by rotating the first support member about the second support member as a second rotation axis after the second support member has made contact with the second end of the guide slot, thereby causing the first support member to slide along one side surface of the notch of the arm member and enter the auxiliary guide slot. As a result, the radius of rotation of the lid during opening and closing is made smaller than it would be in the case of rotation only about the first rotary shaft (single rotation axis).

Moreover, since the bottom surface of the cup holder is configured to conform to the mounting surface, the cup holder body as a whole can be mounted horizontally. In addition, since the cup holder is provided with two axes of rotation, the space needed for lid opening and closing is small, whereby the cup holder can be realized in a compact size.

The above and other features of the present invention will become apparent from the following description made with reference to the drawings.

DESCRIPTION OF THE PREFERRED EMBODIMENT

Figure 1:
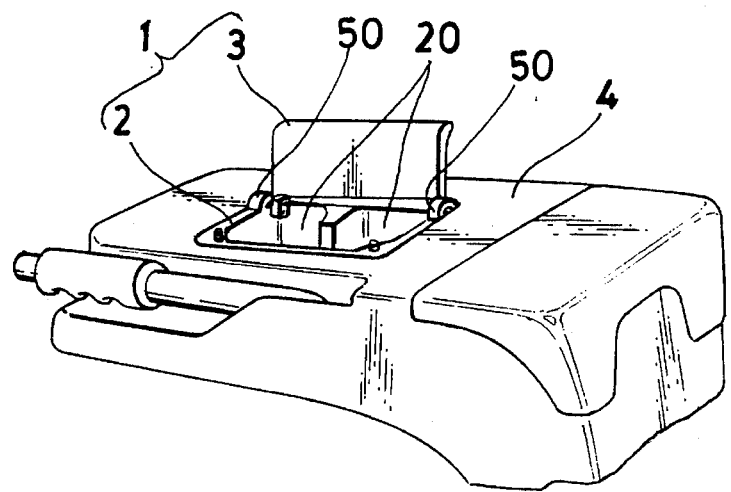
FIG. 1 is a perspective view showing a cup holder that is an embodiment of this invention installed in a center console.
Figure 2:
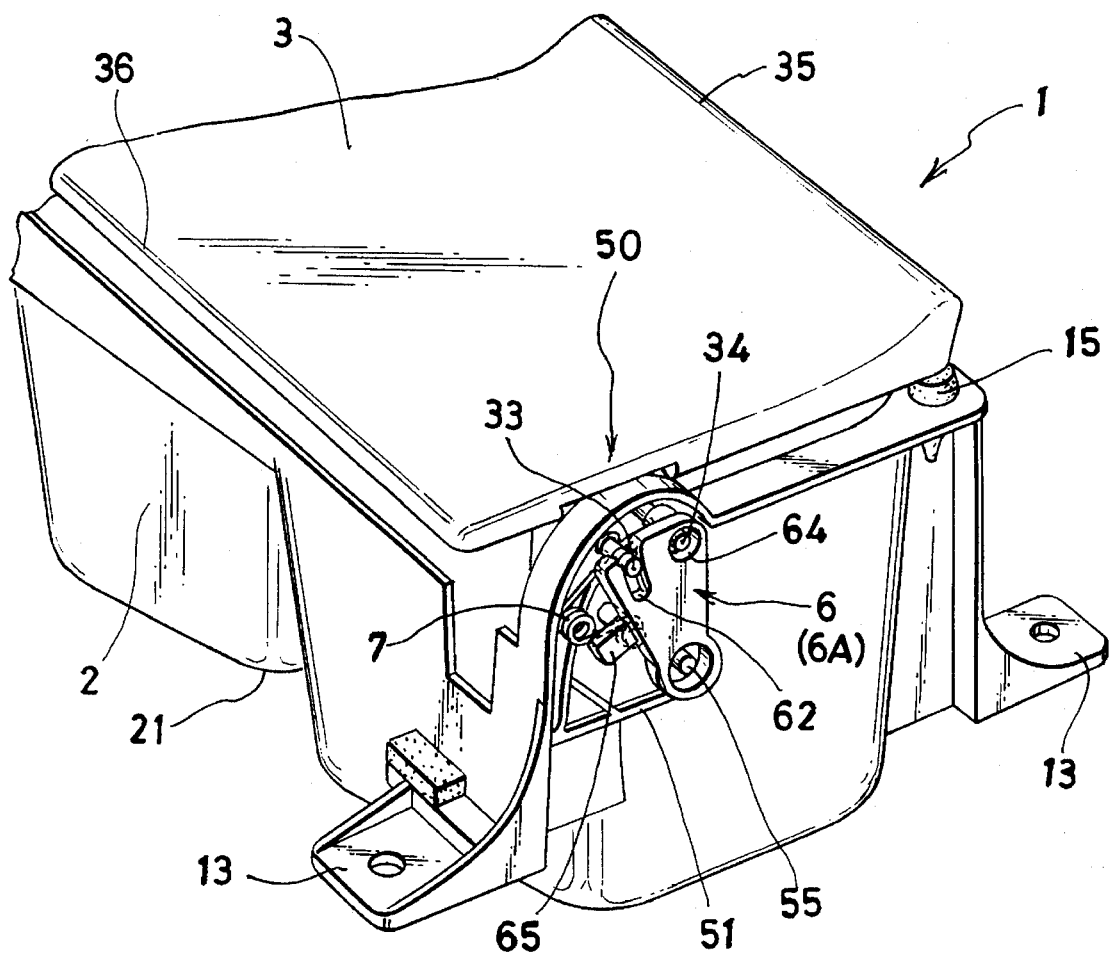
FIG. 2 is a perspective view looking down on the cup holder of FIG. 1 from the front, also showing a device for openably supporting a lid that is an embodiment of the invention.
Figure 3:
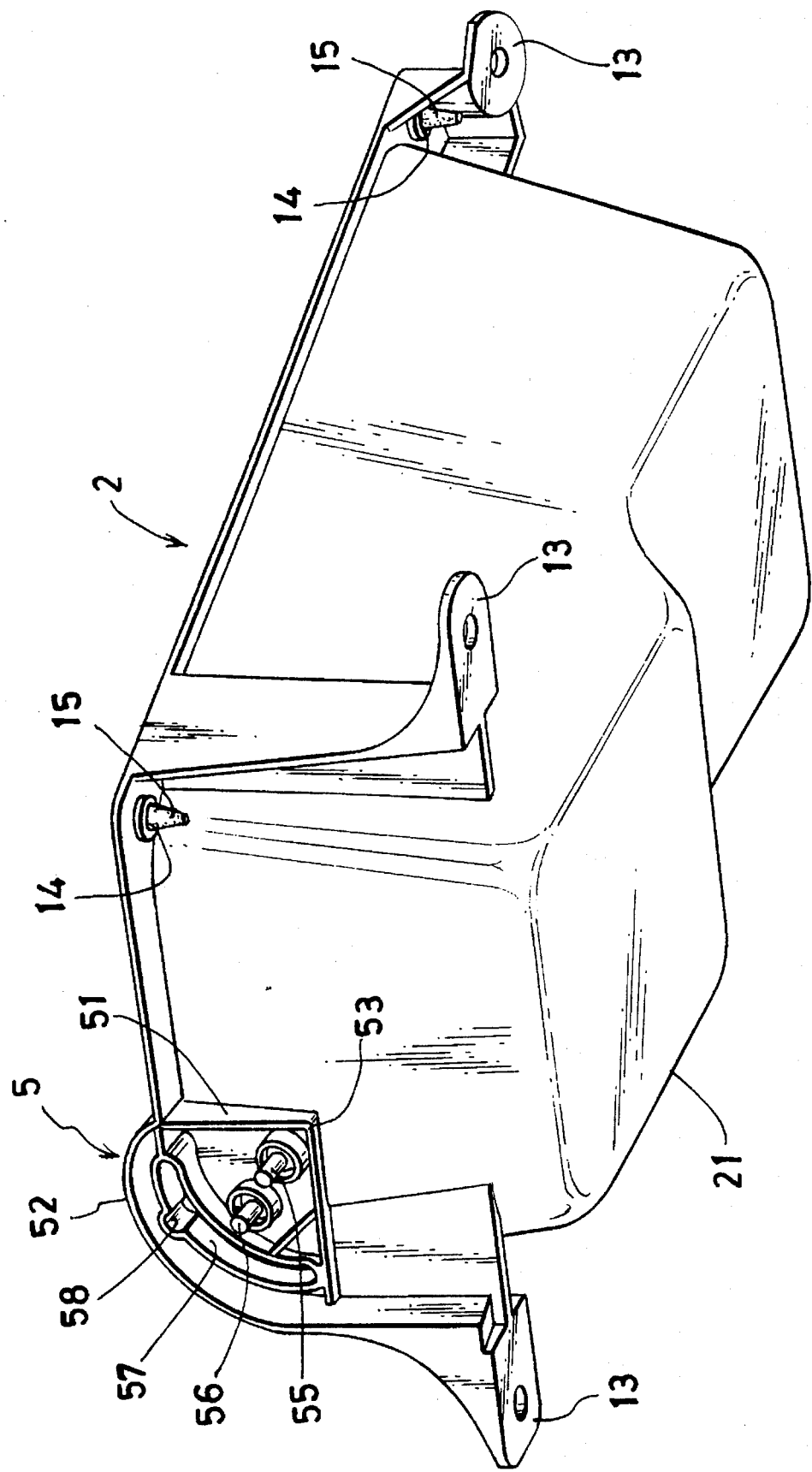
FIG. 3 is perspective view looking up at the body of the cup holder of FIG. 2 from the front.

FIG. 1 shows a cup holder 1 according to this invention installed in a center console 4 located between the driver's seat and the front passenger seat of an automobile. FIG. 2 shows the cup holder 1 removed from the center console 4. The cup holder 1 comprises a cup holder body 2, an openable lid 3 hinged on the cup holder body 2 for covering an opening in the upper surface of the cup holder body 2, and a pair of devices 50 (only one shown) for openably supporting the lid 3. As shown in FIG. 3, a main section 5 of one device 50 is located at an upper corner on the front end of the cup holder body 2. The main section 5 of the other device 50 (neither shown) is located at the upper corner on the same side of the rear end of the cup holder body 2.

The bottom surface 21 of the cup holder body 2 is provided with a step conforming to a similar step in the bottom supporting surface of the center console 4 so that the upper opening of the cup holder body 2 lies horizontal when the cup holder body 2 is installed in the center console 4. The interior of the cup holder body 2 is divided into fore and aft compartments 20 for accommodating the lower portions of cups, bottles, cans and the like. The four outer corners of the cup holder body 2 are formed with mounting members 13 for mounting the cup holder body 2 in the center console 4. Holes 14 are formed at two corners of upper surface of the cup holder body 2 and each hole is fitted with a stop 15 against which the lid 3 comes to rest when completely closed.

As just explained, the front and rear ends of the cup holder body 2 are formed with the main sections 5 of the devices 50. Each main section 5 is formed as a region enclosed by an L-shaped partition 51 rising from a corner portion of the end surface and an bowed wall 52 of arcuate shape connecting the opposite ends of the perpendicular partition 51. Going from the approximately 90° corner 53 of the perpendicular partition 51 toward the center portion of the bowed wall 52, there are found, in the order mentioned, a projecting first rotary shaft 55 for rotatably supporting one end of an arm member 6 (FIG. 2) and a projecting spring support shaft 56 for rotatably supporting one end of a spring 7 (FIG. 2). In addition, an arcuate guide slot 57 is formed in the cup holder body 2 between the spring support shaft 56 and the bowed wall 52 to run parallel to the bowed wall 52. A portion of the upper edge of the guide slot 57 at a point slight offset from its longitudinal center is bulged toward the bowed wall 52 so as to form an auxiliary guide slot (depression) 58. The guide slot 57 and the auxiliary guide slot 58 are enclosed by a guide wall standing at the same height as the L-shaped partition 51.

Figure 4:
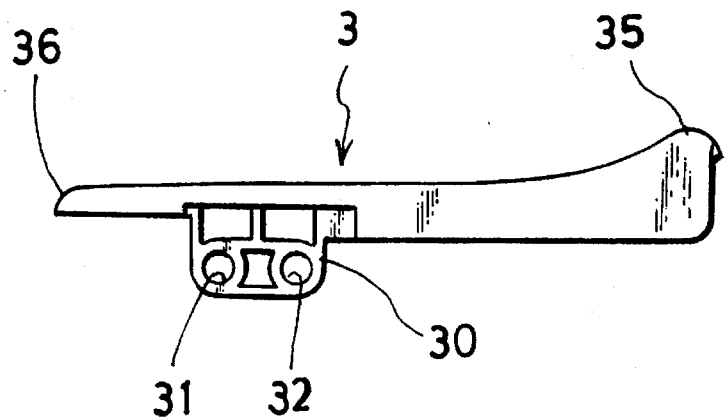
FIG. 4 is an front end view of the lid of the cup holder of FIG. 2.
Figure 5:
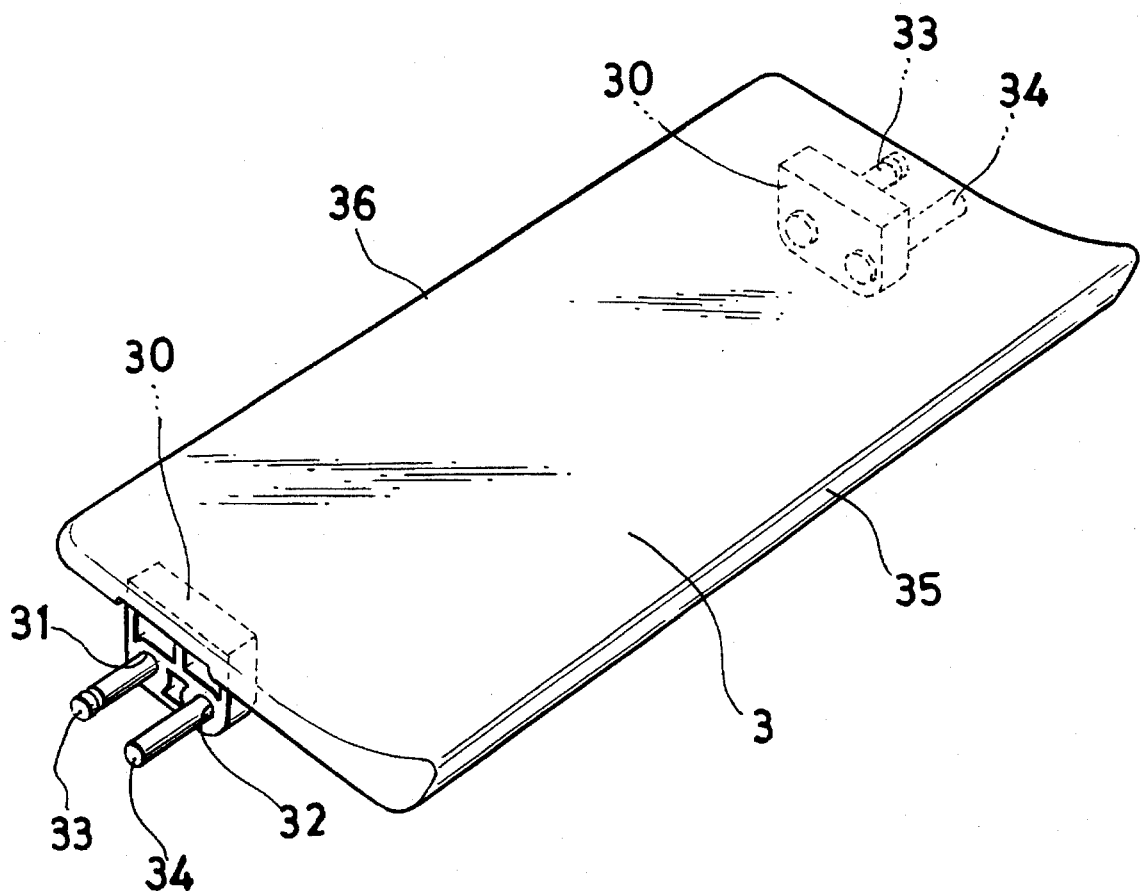
FIG. 5 is a perspective view of the lid of FIG. 4 seen from the front.

The lid 3 for closing the top opening of the cup holder body 2 is a plate member matched to the shape and size of the top opening. As shown in FIGS. 4 and 5, one of its longer edges (longer edge 35) is formed to a thickness making it easy to catch with the fingers, and a protuberance 30 is formed along each of its shorter edges at a position offset a little toward the other longer edge 36 from center. Each protuberance 30 is formed with side-by-side through-holes 31, 32 extending parallel to the longitudinal direction of the lid 3. The through-hole 31 is on the side of the protuberance 30 closer to the longer edge 36 and the through-hole 32 is on the side thereof closer to the longer edge 35. A first support member 33 and a second support member 34, each consisting of a head and a shaft, are inserted into the through-holes 31, 32 so that their shafts project outward and their heads abut on the inner side surface of the protuberances 30. When the lid 3 is attached to the cup holder body 2, the shafts of the first and second support members 33, 34 pass through the guide slot 57 and engage with the distal end of the arm member 6.

The arm members 6 on the front and rear ends of the cup holder body 2 are identical except that their shapes are mirror images of each other and that only the front arm member 6A is provided with a spring retainer 65. In general, therefore, only the front arm member 6A will be explained in the following on the understanding that substantially the same comments also apply to the rear arm member 6B.

Figure 6:
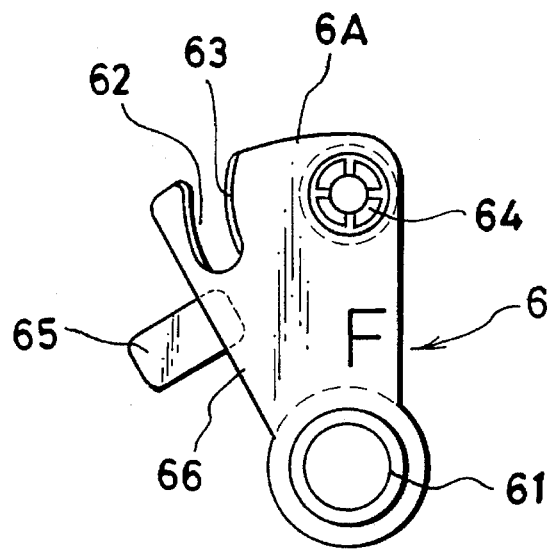
FIG. 6 is a front view of an arm member of the device for openably supporting a lid of FIG. 2.
Figure 8:
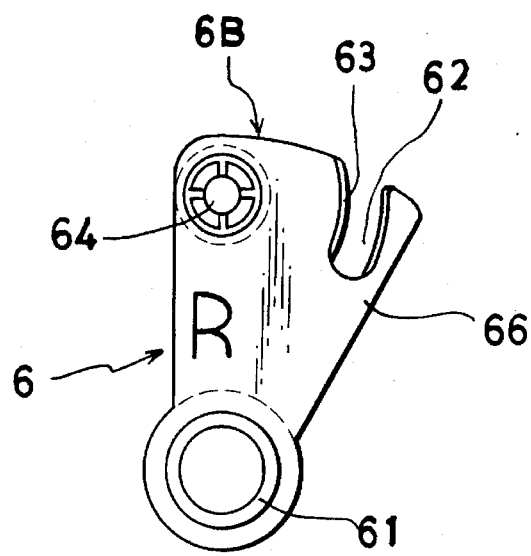
FIG. 8 is a rear view of the arm member of FIG. 6.
Figure 7:
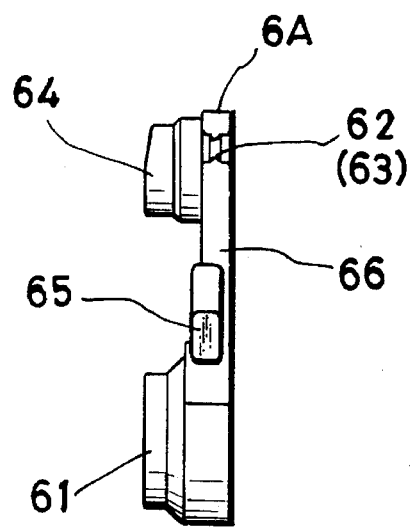
FIG. 7 is a left side view of the arm member of FIG. 6.
Figure 9:
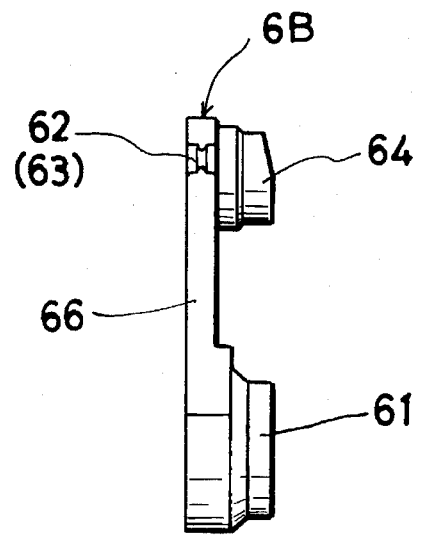
FIG. 9 is a right side view of the arm member of FIG. 6.

As shown in FIGS. 6 and 7, the front arm member 6A is a thin plate member whose width gradually increases from one end to the other. The narrower end is formed with a through-hole 61 in which the first rotary shaft 55 is rotatably fitted and the wider end is formed with a notch 62 for receiving the shaft of the first support member 33 and with a through-hole 64 in which the shaft of the second support member 34 is rotatably fitted. The aforesaid spring retainer 65 is formed to project from one side edge 66 of the front arm member 6A. (As explained later, the rear device 50 does not require the spring retainer 65.)

Figure 10:
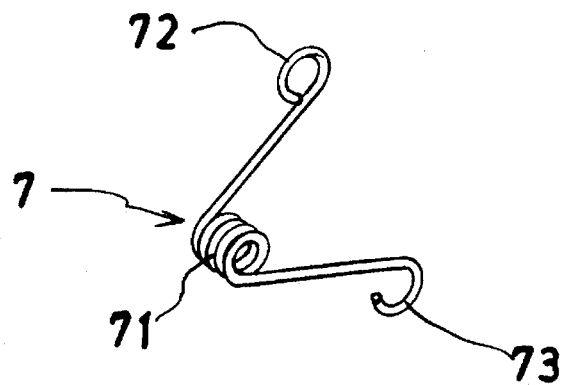
FIG. 10 is a perspective view of a spring of the device for openably supporting a lid of FIG. 2.
Figure 11:
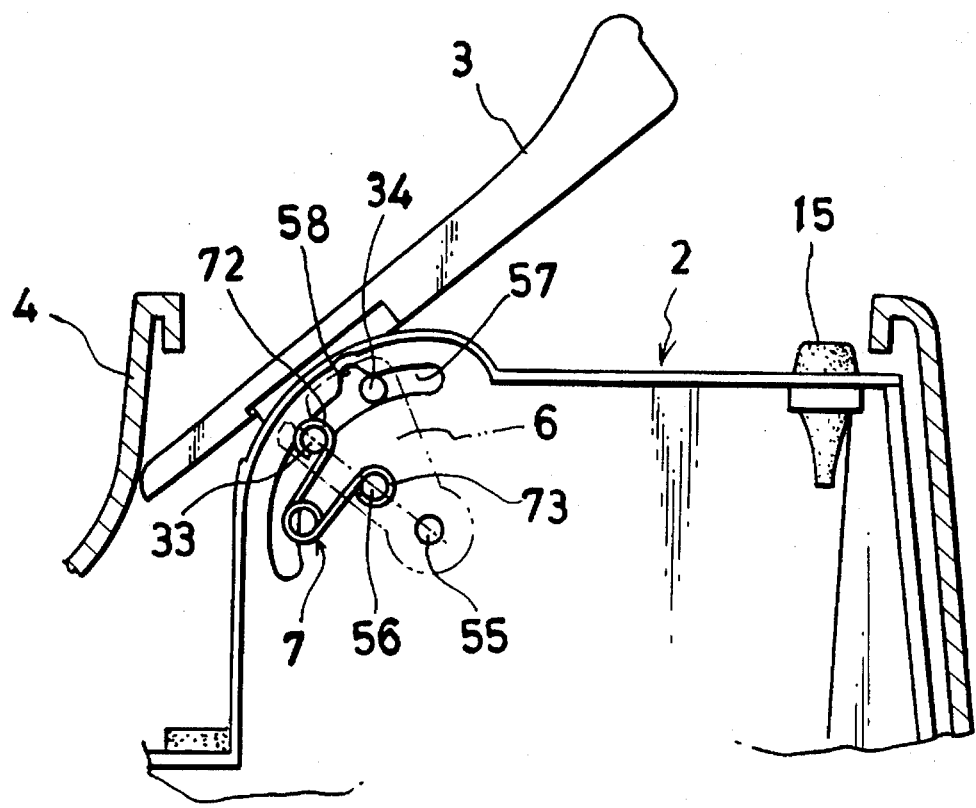
FIGS. 11 to 15 are schematic views for explaining the operation of the device for openably supporting a lid of FIG. 2.
Figure 12:
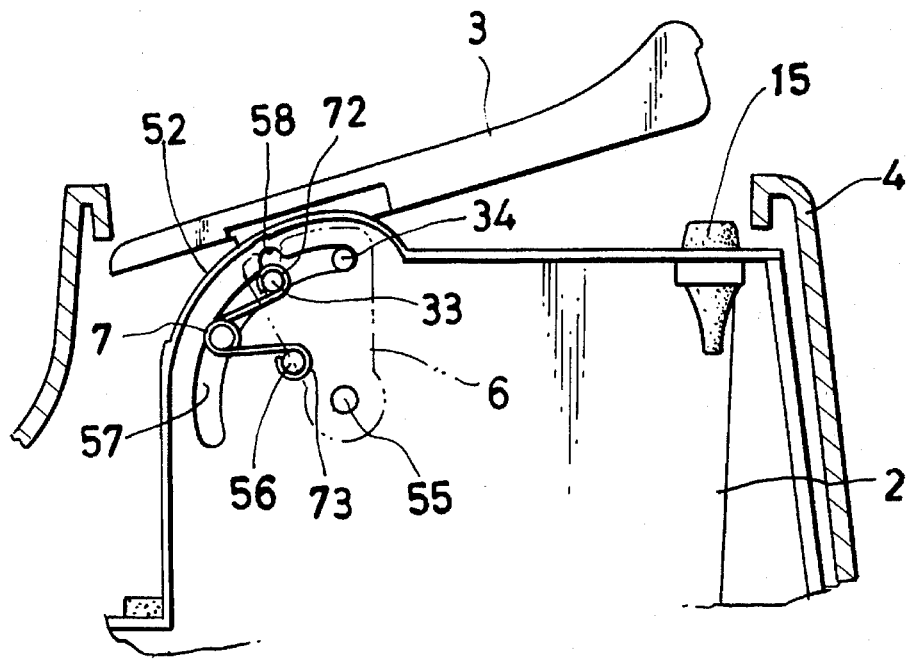
Figure 13:
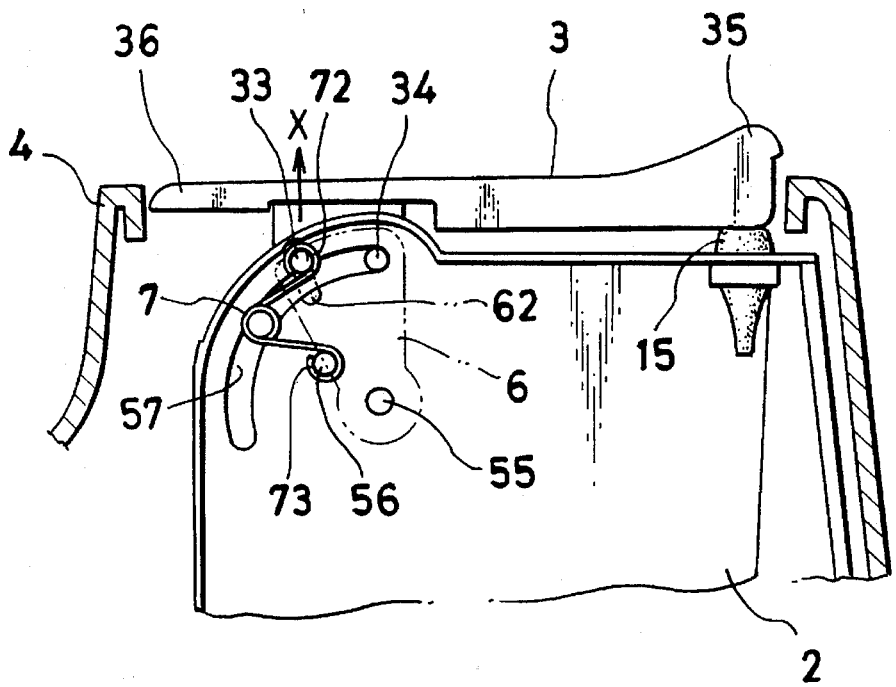
Figure 14:
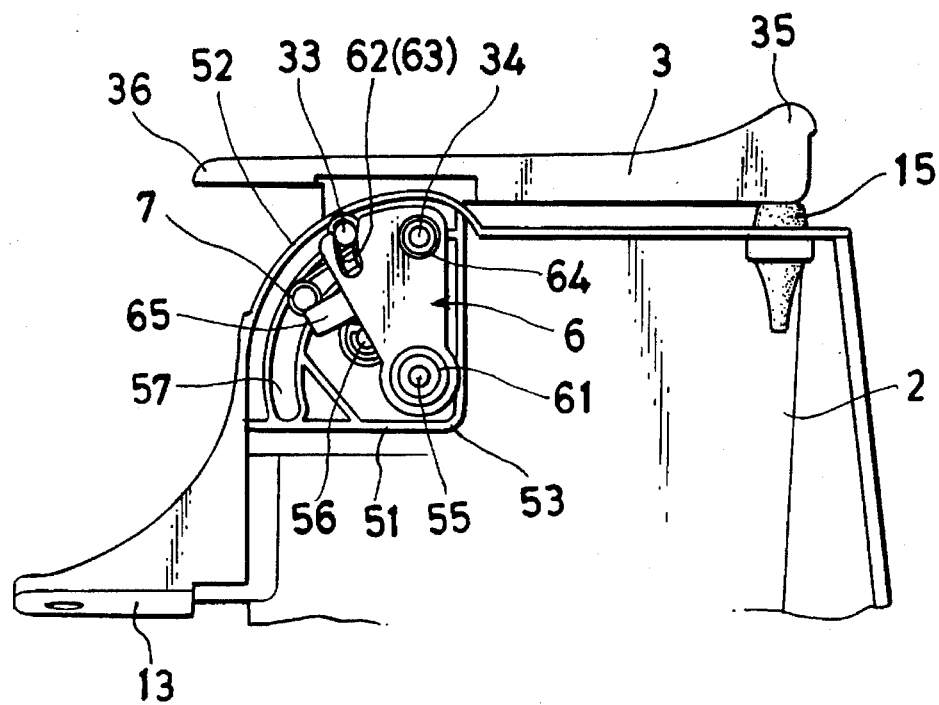
Figure 15:
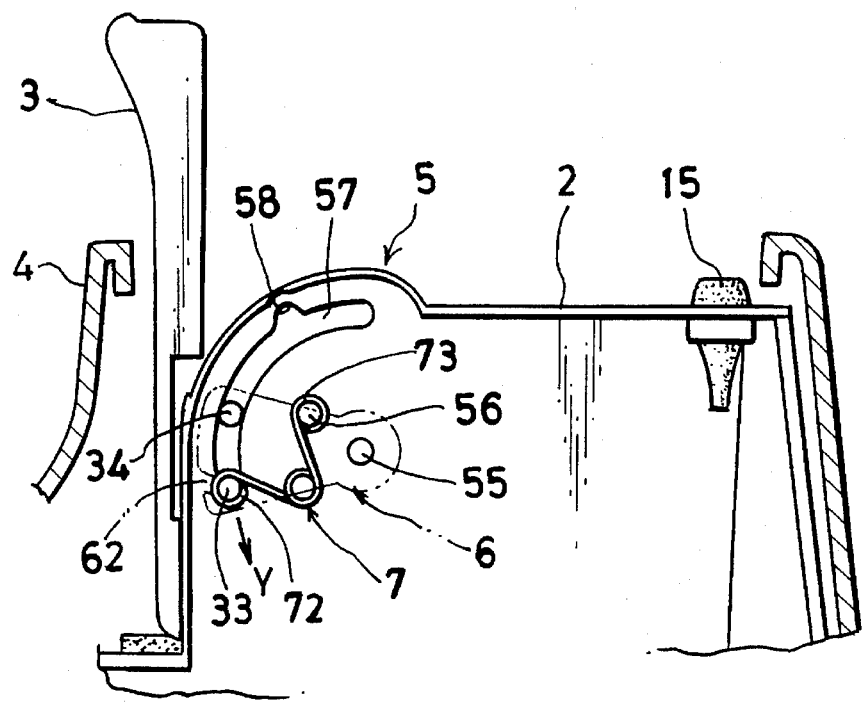

As shown in FIG. 10, the spring (energizing member) 7 is formed by winding an elastic wire material into a helical coil 71 whose opposite ends continue into a first hooked extension 72 and a second hooked extension 73 which diverge at a prescribed angle when the coil 71 is in the normal, unloaded state.

Figure 16:
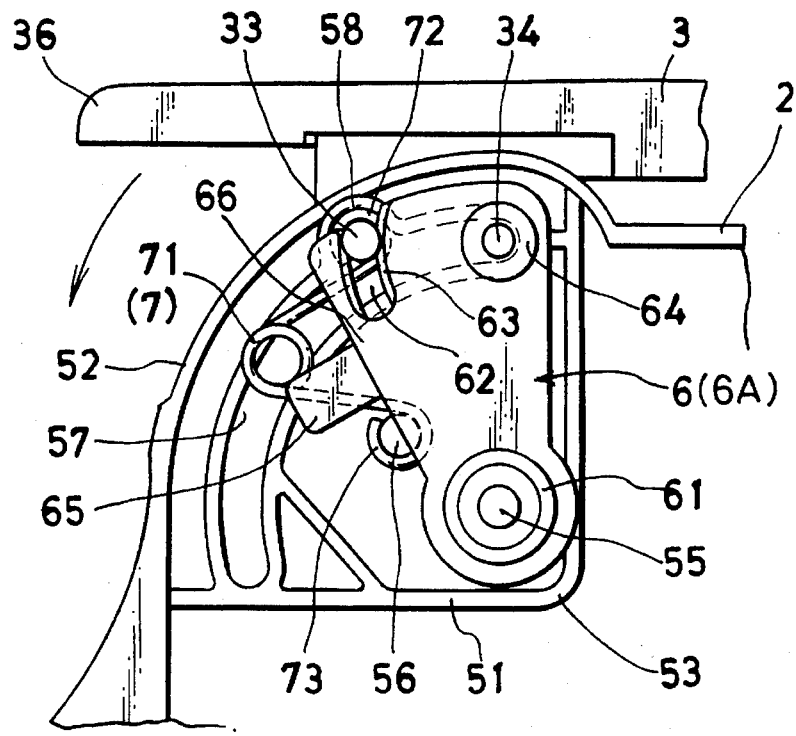
FIG. 16 is a partial front-end view of the cup holder body showing the retained state of the spring of the front device for openably supporting a lid of FIG. 2.
Figure 17:
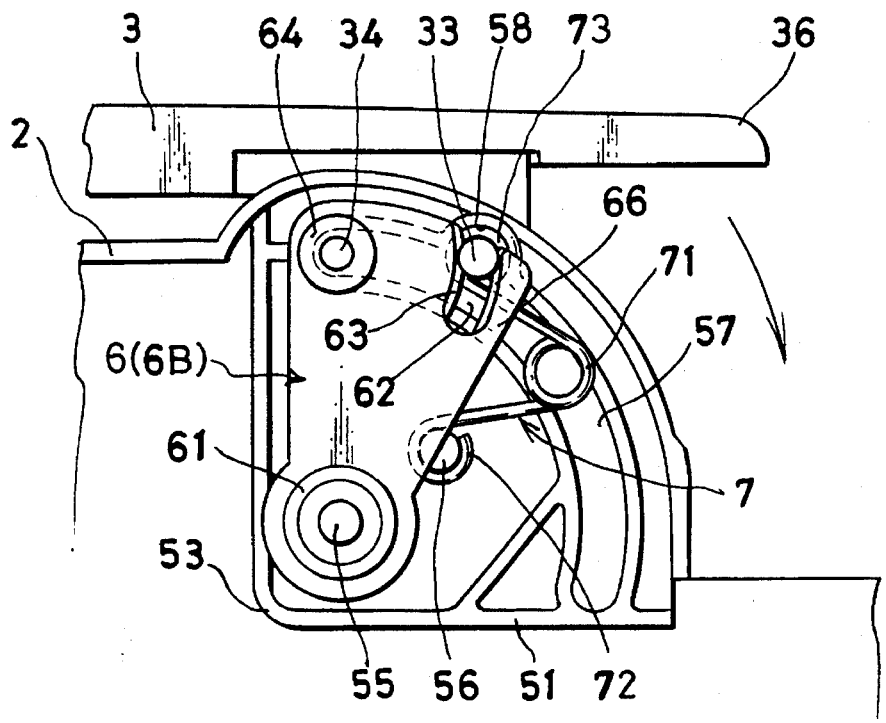
FIG. 17 is a partial rear-end view of the cup holder body showing the retained state of the spring of the rear device for openably supporting a lid of FIG. 2.

The device 50 for openably supporting a lid is constituted by assembling the second support members 33, 34 of the lid 3, the arm member 6 and the spring 7 in the main section 5. For this, the first and second support members 33, 34 are passed through the guide slot 57 from the inside of the cup holder body 2, the first hooked extension 72 and the second hooked extension 73 of the spring 7 are squeezed toward each other slightly and the so-loaded spring 7 is mounted by fitting the hooked portions of the first hooked extension 72 and second hooked extension 73 on the first support member 33 and the spring support shaft 56 to be rotatable with respect thereto. In the front device 50, the first hooked extension 72 is fitted on the first support member 33 and the second hooked extension 73 on the spring support shaft 56 (FIG. 16), while in the rear device 50, the first hooked extension 72 is fitted on the spring support shaft 56 and the second hooked extension 73 on the first support member 33 (FIG. 17). The arm member 6 is mounted by fitting its notch 62 onto the first support member 33, its through-hole 61 rotatably onto the first rotary shaft 55 and its through-hole 64 rotatably onto the second support member 34.

When the device 50 has been assembled in this manner, the spring 7 exerts a force about the spring support shaft 56 so as to constantly press the first support member 33 onto the upper edge of the guide slot 57. The movement of the first and second support members 33, 34 during opening/closing of the lid 3 is guided by the guide slot 57 and the auxiliary guide slot 58. The auxiliary guide slot 58 is located so that the first support member 33 comes opposite thereto when the second support member 34 makes contact with the second end of the guide slot 57 prior to complete closure of the lid 3. When the lid 3 is completely open, the first support member 33 is in contact with the second end of the guide slot 57.

The operation of the device 50 during opening and closing of the lid 3 will now be explained with reference to FIGS. 11–15. The neutral position of the lid 3 will be explained first. When the lid 3 is brought to the position shown in FIG. 11, i.e., when it is opened to the point where the first rotary shaft 55, the spring support shaft 56 and the first support member 33 lie on a straight line, the spring 7 produces no force (torsion) acting in either the direction of opening or the direction of closing the lid 3. As a result, the lid 3 remains open at a prescribed angle in this neutral state.

When the lid 3 is moved even slightly in the closing direction from the prescribed angle of the neutral position, the force of the spring 7 acts on the first support member 33 about the spring support shaft 56, whereby the lid 3 is forcibly closed. At the beginning of this action, the first support member 33 and the second support member 34 move together with the arm member 6 along the guide slot 57 describing an arcuate path centered on the first rotary shaft 55. As a result of this movement, the lid 3 also pivots about the first rotary shaft 55 in the closing direction.

Just before the lid 3 completely closes, the second support member 34 strikes on the second end of the guide slot 57. Since the force of the spring 7 thereafter rotates the first support member 33 about the second support member 34 as its new (second) rotation axis, the first support member 33 is slid along the side surface 63 of the notch 62 and forced into the auxiliary guide slot 58. Owing to this movement of the first support member 33 from the guide slot 57 into the auxiliary guide slot 58, the lid 3 also rotates about the second support member 34 in the closing direction, thereby reaching the completely closed state shown in FIGS. 13 and 14. Since in the completely closed state of the lid 3 the first support member 33 is constantly urged to rotate about the second support member 34 in contact with the second end of the guide slot 57 by a force acting thereon in the X direction, the lid 3 is firmly held in its closed state.

On the other hand, when the lid 3 is moved even slightly in the opening direction from the prescribed angle of the neutral position, the force of the spring 7 acts on the first support member 33 about the spring support shaft 56, whereby the lid 3 is forcibly opened. In the course of this action, the first support member 33 and the second support member 34 move together with the arm member 6 along the guide slot 57 in the opening direction, describing an arcuate path centered on the first rotary shaft 55 and bringing the lid 3 to the completely open position shown in FIG. 15. Since in the completely open state of the lid 3 the first support member 33 is constantly urged by a force acting thereon about the first rotary shaft 55 in the Y direction, the lid 3 is forcibly held open.

In the embodiment explained in the foregoing, identically configured springs 7 are used in the devices 50 on the front and rear ends of the cup holder body 2. Therefore, as shown in FIG. 16, in the device 50 on the front end the second hooked extension 73 of the spring 7 is fitted on the spring support shaft 56, while, as shown in FIG. 17, in the device 50 on the rear end it is fitted on the first support member 33. On both the front and rear ends, the spring 7 has to be constantly pressed in the direction of the end surface of the cup holder body 2. This is achieved by retaining the second hooked extension 73 of the spring 7 by means of the spring retainer 65 of the arm member 6 (6A) on the front end and by means of the side edge 66 of the arm member 6 (6B) on the rear end.

The spring 7 requires several steps for its manufacture and is therefore expensive, while the arm member 6 is relatively simple and cheap to manufacture. The use of identical springs 7 but differently configured front and rear arm members 6A, 6B in the foregoing manner therefore makes it possible to fabricate the device 50 at lower cost.

In the embodiment described in the foregoing, once the lid 3 has been opened beyond the prescribed angle it is thereafter completely opened by rotating the first support member 33 around the first rotary shaft 55, while once it has been closed beyond the prescribed angle it is thereafter completely closed by rotating the first support member 33 about the second support member 34 as its second rotation axis after the second support member 34 has come in contact with the second end of the guide slot 57, thereby causing the first support member 33 to slide along the side surface 63 of the notch 62. Since the lid 3 is therefore opened and closed by rotation about two rotational axes, the radius of rotation and the amount of space required for installation are made smaller than they would be in the case of rotation only about the first rotary shaft (single rotation axis) 55. The cup holder 1 is therefore easy to install.

Moreover, since the bottom surface of the cup holder 1 is configured to conform to the mounting surface, the cup holder body as a whole can be mounted horizontally. In addition, since the cup holder 1 secures two axes of rotation by adopting the device 50, thereby reducing the space needed for lid opening and closing, it can be realized in a compact size enabling installation even in a small center console.

As explained in the foregoing, since the device for openably supporting a lid according to this invention enables the lid to be opened and closed by rotation about two axes, the radius of rotation during lid opening and closing is smaller than in the case of a single rotation axis. The cup holder utilizing the device can therefore be easily installed even when space is limited.

Moreover, since the cup holder according to this invention is provided with a bottom surface conforming to the mounting surface, the cup holder as a whole can be installed horizontally irrespective of the configuration of the mounting surface. In addition, since the cup holder adopts a device for openably supporting a lid that has two axes of rotation, thereby reducing the space needed for lid opening and closing, it can be realized in a compact size enabling installation even in a small center console.

What is claimed is:

1. A device for openably supporting a lid comprising:

a lidded object closed by the lid, a first rotation axis provided on an end surface of the lidded object, an arm member rotatable about the first rotation axis and having a notch and a shaft insertion hole at its distal end portion, an arcuate guide slot formed in the end surface of the lidded object along a path described by the distal end portion of the arm member when the arm member rotates about the first rotation axis, an auxiliary guide slot formed as a depression in an upper edge of the guide slot, a first support member having a shaft-like portion which projects from the lid, through the guide slot and into the notch of the arm member, moves along the guide slot with opening/closing of the lid and makes contact with a first end of the guide slot when the lid is completely open, a second support member having a shaft-like portion which projects from the lid, through the guide slot and into the shaft insertion hole of the arm member, moves along the guide slot with opening/closing of the lid and makes contact with a second end of the guide slot when the lid is almost completely closed, and an energizing member for pressing the first support member in the direction of the upper edge of the guide slot, the energizing member applying a force to the first support member when the lid is at greater than a prescribed opening angle for moving the first support member into contact with the first end of the guide slot while rotating the arm member about the first rotation shaft and completely opening the lid, and the energizing member applying a force to the first support member when the lid is at less than the prescribed opening angle for moving the first support member toward the auxiliary guide slot till the second support member makes contact with the second end of the guide slot and then rotating the first support member about the second support member as a second rotation axis thereby causing the first support member to move along a side surface of the notch till the first support member enters the auxiliary guide slot and the lid is completely closed.

2. A cup holder comprising:

a cup holder body having a top opening communicating with at least one internal compartment for holding a cup and a bottom surface configured to conform to an intended mounting surface for enabling the top opening to lie horizontally after mounting, a lid for opening and closing the top opening of the cup holder body, and at least one device for openably supporting the lid on the cup holder body, the device for openably supporting the lid including a first rotation axis provided on an end surface of the cup holder body, an arm member rotatable about the first rotation axis and having a notch and a shaft insertion hole at its distal end portion, an arcuate guide slot formed in the end surface of the cup holder body along a path described by the distal end portion of the arm member when the arm member rotates about the first rotation axis, an auxiliary guide slot formed as a depression in an upper edge of the guide slot, a first support member having a shaft-like portion which projects from the lid, through the guide slot and into the notch of the arm member, moves along the guide slot with opening/closing of the lid and makes contact with a first end of the guide slot when the lid is completely open, a second support member having a shaft-like portion which projects from the lid, through the guide slot and into the shaft insertion hole of the arm member, moves along the guide slot with opening/closing of the lid and makes contact with a second end of the guide slot when the lid is almost completely closed, and an energizing member for pressing the first support member in the direction of the upper edge of the guide slot, the energizing member applying a force to the first support member when the lid is at greater than a prescribed opening angle for moving the first support member into contact with the first end of the guide slot while rotating the arm member about the first rotation shaft and completely opening the lid, and the energizing member applying a force to the first support member when the lid is at less than the prescribed opening angle for moving the first support member toward the auxiliary guide slot till the second support member makes contact with the second end of the guide slot and then rotating the first support member about the second support member as a second rotation axis thereby causing the first support member to move along a side surface of the notch till the first support member enters the auxiliary guide slot and the lid is completely closed.

* * * * *